March 19, 1957 A. BECKER 2,785,761
APPARATUS FOR WALKING HEAVY STRUCTURES
Filed June 8, 1953 4 Sheets-Sheet 1
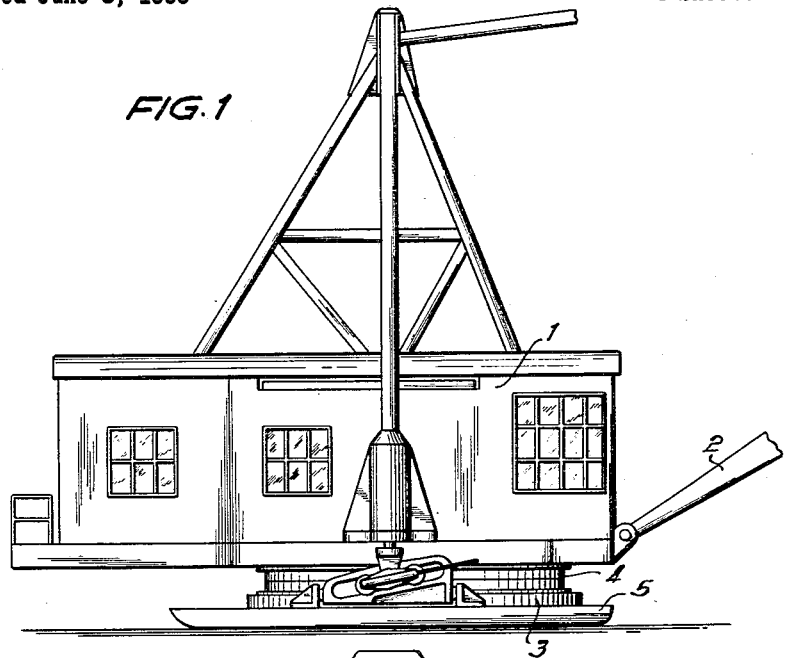
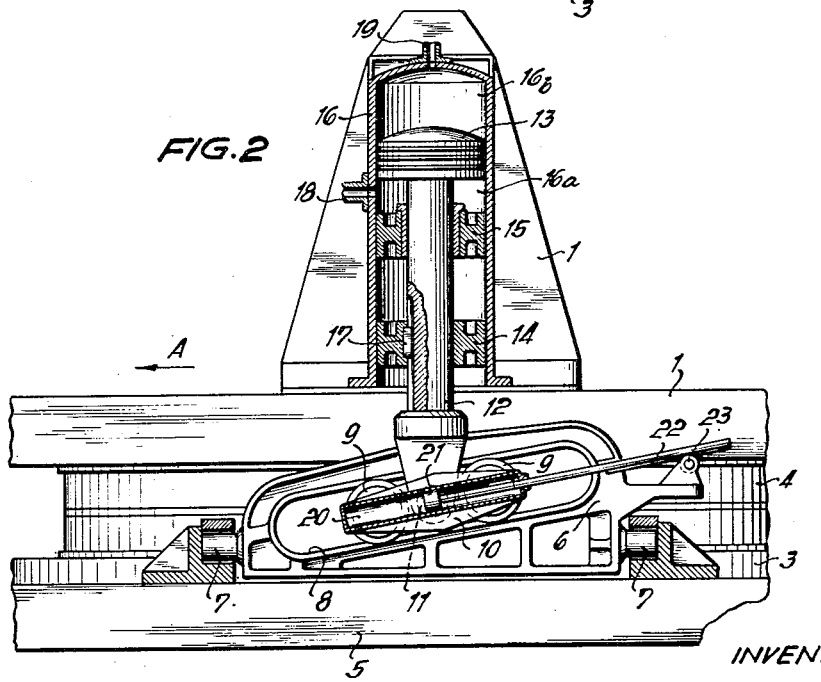
INVENTOR
Anton Becker
by Michael S. Striker March 19, 1957 A. BECKER 2,785,761
APPARATUS FOR WALKING HEAVY STRUCTURES
Filed June 8, 1953 4 Sheets-Sheet 2
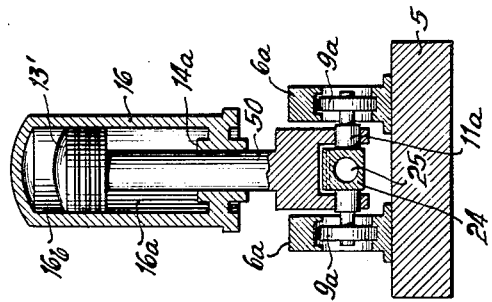
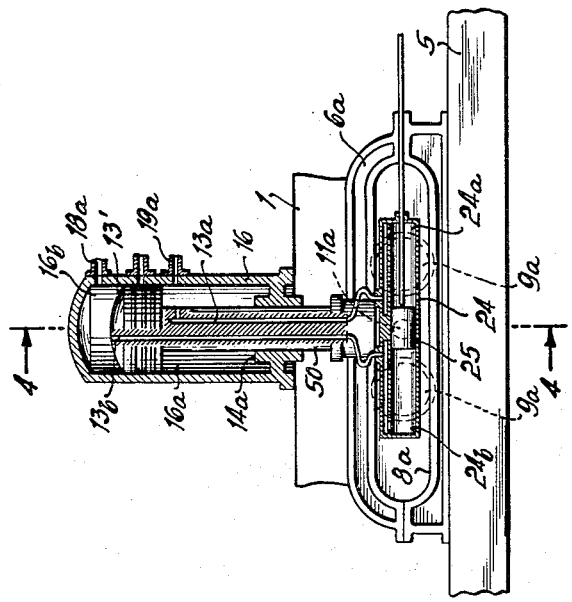
INVENTOR
Anton Becker
by: Michael S. Striker
Agt.

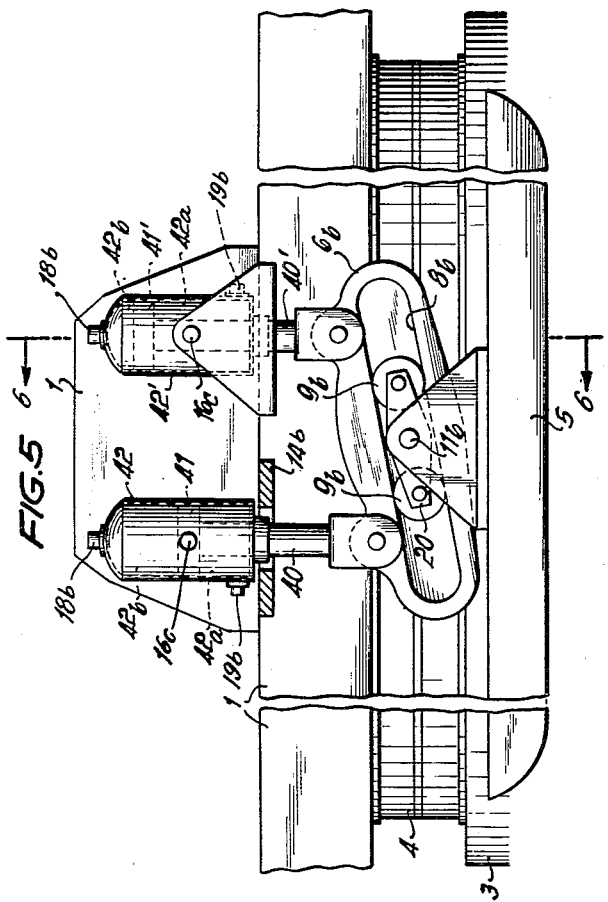
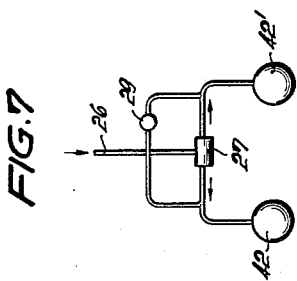
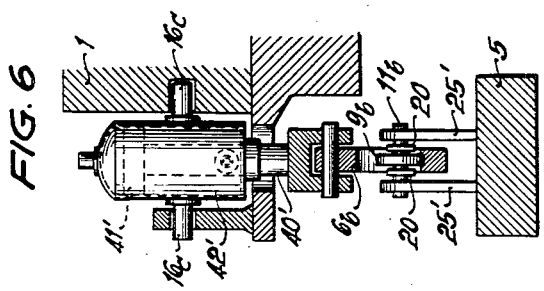

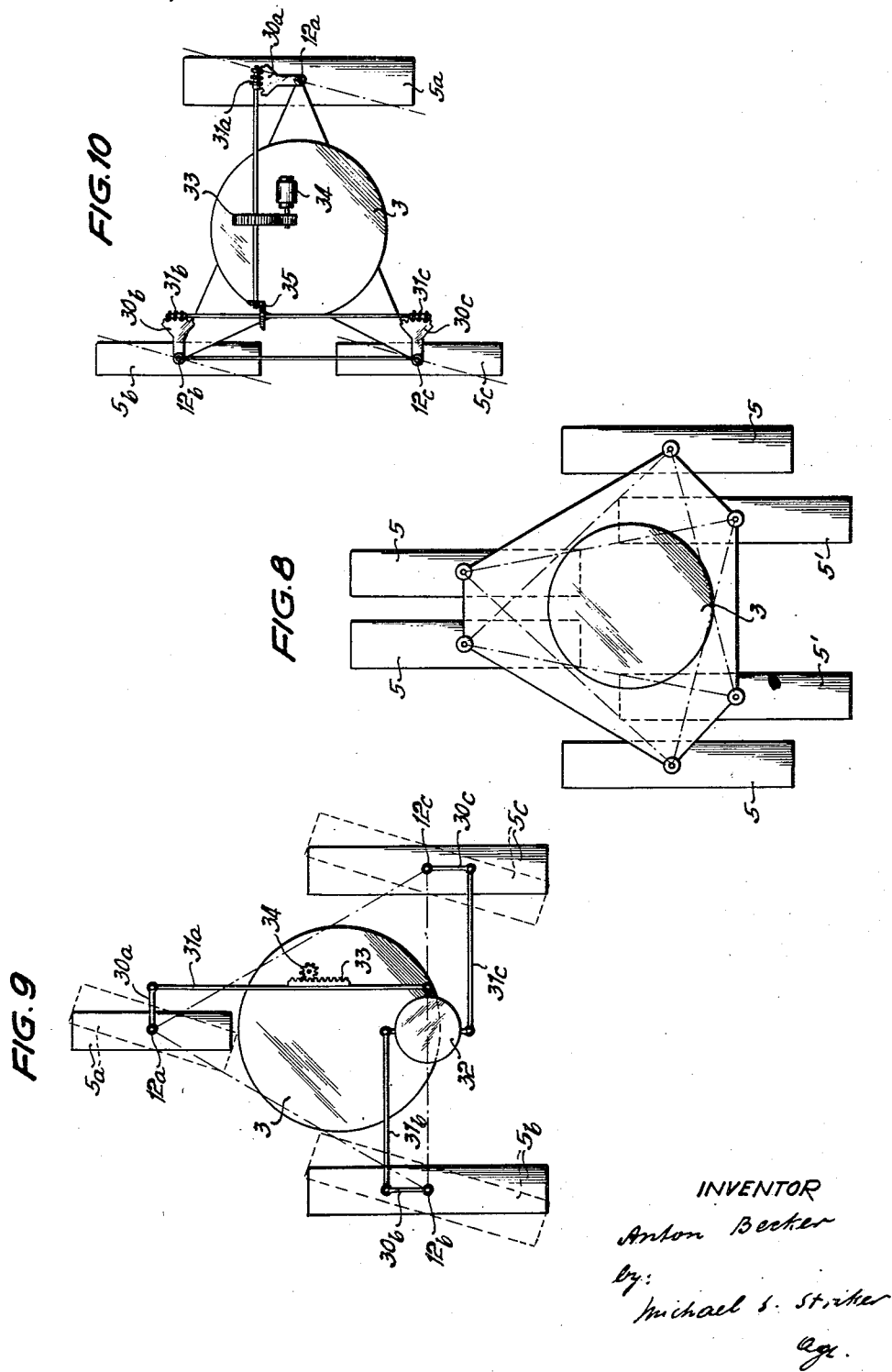

United States Patent Office 2,785,761
Patented Mar. 19, 1957

2,785,761

APPARATUS FOR WALKING HEAVY STRUCTURES

Anton Becker, Gindorf, Germany, assignor to Maschinenfabrik Buckau R. Wolk Aktiengesellschaft, Grevenbroich, Germany Application June 8, 1953, Serial No. 360,025

21 Claims. (Cl. 180—8)

The present invention relates to apparatus for transporting heavy structures.

In certain industries such as open pit mining there are extremely heavy structures such as power shovels, cranes and the like which must be moved from time to time. The known apparatus for moving such structures have several disadvantages. For one thing, it is usually only possible to move such structures through increments of a predetermined size which makes it difficult to accurately locate the structures at a given point; for another thing, the structures very often tilt undesirably during movement thereof; and thirdly, it is very difficult to control the direction in which such structures move. Furthermore, it is common to move such structures by raising the same with eccentrics and the like, and such an apparatus is subjected to tremendous stresses which also are very undesirable.

One of the objects of the present invention is to overcome the above drawbacks by providing an apparatus for raising and simultaneously moving heavy structures through any desired distance.

Another object of the present invention is to provide a means for easily controlling the direction in which such heavy structures are transported.

A further object of the present invention is to provide a means for transporting heavy structures of the above type without tilting the same.

An additional object of the present invention is to provide a means other than eccentrics and the like for raising structures so that undesirably large stresses are avoided.

Still another object of the present invention is to provide a means for transporting structures of the above type which does not interfere in any way with the operation of these structures so that the latter may, if desired, be operated simultaneously with their transportation.

A still further object of the present invention is to provide a transporting means which requires the heavy structures to be raised only through a very small distance which is sufficient to overcome the friction between such structures and the ground or other surface on which they normally rest.

With the above objects in view, the present invention mainly consists of a transporting arrangement which includes a first structure to be transported, a second structure to support the first structure during transportation thereof, and a means interconnecting these structures for alternately raising each of the structures and moving the same in a predetermined direction with respect to the other of the structures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly diagrammatic side view of an apparatus constructed in accordance with the present invention;

Fig. 2 is a partly sectional fragmentary elevational view on an enlarged scale of the structure of Fig. 1;

Fig. 3 is a partly sectional elevational view of a different embodiment of an apparatus constructed in accordance with the present invention;

Fig. 4 is a sectional view of the embodiment shown in Fig. 3, the section being taken along the line 4—4 of Fig. 3 viewed in the direction of the arrows;

Fig. 5 is a diagrammatic elevational view of still another embodiment of an apparatus constructed in accordance with the present invention;

Fig. 6 is a sectional view of the embodiment shown in Fig. 5, the section being taken along the line 6—6 of Fig. 5 viewed in the direction of the arrows;

Fig. 7 is a diagrammatic illustration of a fluid supply and control means used with the apparatus of Fig. 5;

Fig. 8 is a diagrammatic top plan view of an arrangement of platforms constructed in accordance with the present invention;

Fig. 9 is a diagrammatic top plan view of one possible apparatus for controlling the direction in which a heavy structure is transported; and Fig. 10 is a diagrammatic top plan view of another possible apparatus for controlling the direction in which a heavy structure is transported.

Referring now to the drawings, Fig. 1 shows the superstructure 1 of an open pit mining apparatus, for example, to be transported, this apparatus 1 having a tiltable beam 2, for example, extending therefrom. The apparatus 1 includes a bottom portion 3 which contacts the ground, for example, when the structure 1 is not being transported, this bottom or floor portion 3 of the structure 1 being interconnected with the latter through a known device 4, diagrammatically shown in the drawings, for turning the superstructure 1 with respect to the floor portion 3. Platforms 5 are arranged on opposite sides of the structure 1 for supporting the latter during transportation thereof, these platforms 5 being interconnected with the structure 1 through a plurality of guide means, respectively, for guiding the structure 1 in a predetermined direction with respect to the platforms 5.

As is clearly shown in Fig. 2, each platform 5 is connected to a frame 6 of each guide means through the medium of a pair of horizontally extending pins 7 of the frame 6 which are turnable in bearings fixed to the platform 5, these pins 7 and their bearings extending along an axis parallel to the longitudinal axis of platform 5 so that the latter is turnable with respect to the frame 6 about the horizontal axis of the pair of pins 7 and their bearings. Each guide means includes a track 8 of the frame 6 which extends in a downwardly inclined direction, and each guide means further includes a pair of supporting rollers 9 engaging the track 8 for movement therealong. Each pair of rollers 9 is turnably connected to a pair of opposite side plates 10 which are connected to a transverse pin 11 extending between these side plates and located between the rollers 9, as is shown in Fig. 2. Each transverse pin 11 is turnably connected to the bottom end portion of a shaft 12 which is fixed to or integral with a piston 13 located at the top end of shaft 12.

A second guide means is fixed to the structure 1 and engages each shaft 12 to interconnect these shafts and the structure 1 for vertical movement with respect to each other, the shafts 12 extending in a vertical direction, as shown in Fig. 2. This second guide means takes the form of a pair of bearings 14 and 15 in which the shaft 12 is mounted for movement along its axis, and these bearings 14 and 15 are fixed to the structure 1 through the medium of a cylinder 16 enclosing and fixed to these bearings and being itself fixed to the structure 1. As is shown in Fig. 2, the piston 13 slidably engages the inner surface of cylinder 16 and is located above the bearings 14 and 15, the piston 13 forming with the top bearing 15 a chamber 16a in the cylinder 16 and forming with the top end of the cylinder a chamber 16b in this cylinder. A pair of fluid guide means 18 and 19 respectively communicate with the chambers 16a and 16b for leading a fluid under pressure to and from these chambers to be located respectively at the bottom and top sides of the piston 13. A key 17 is fixed to the bottom bearing 14 and slidably engages a keyway formed in the shaft 12 to prevent rotation of the latter in the particular embodiment of the invention which is shown in Fig. 2. The fluid under pressure supplied to the cylinder 16 may be oil, for example.

A damping apparatus is provided to retard the movement of the structure 1 and the platform 5 with respect to each other so that this movement will be smooth, and this damping means takes the form of a cylinder 20 filled with oil or the like and having a perforated piston 21 located therein. This piston 21 is fixed to a piston rod 22 which is fixed to the frame 6 at 23 so that the piston 21 is stationary with respect to the platform 5. This fixing of the piston rod 22 at 23 may, for example, be brought about through overlapping ears respectively fixed to frame 6 and piston rod 22 and being traversed by a pin, as shown in Fig. 2.

The above described apparatus operates as follows:

Assuming that the apparatus is in the position shown in Fig. 2, then filling of the chambers 16b with a fluid under pressure, such as oil, will raise the structure 1 and bottom portion 3 thereof with respect to the platforms 5. Since each track 8 is downwardly inclined, the weight of the structure 1 transmitted to each track 8, during raising of this structure, through the rollers 9 will have a forward component acting in the direction of arrow A of Fig. 2 as well as a downward component, so that as soon as the force of friction between the ground and part 3 of structure 1 is overcome, this structure 1 will tend to move downwardly along the tracks 8, and the structure 1 will move to the left with respect to the platforms 5, as viewed in Fig. 2, during an increase in the volume of the chambers 16b. Thus, it will be seen that during transportation of the structure 1 in accordance with the present invention, it is raised only through a very slight distance sufficient to overcome the force of friction and then moves horizontally with respect to the platforms 5, the raising force being applied simultaneously with the transportation of the structure 1. During such movement of the structure 1, the cylinders 20 move with respect to the pistons 21 to retard the movement of the structure 1 and therefore provide a smooth movement of the heavy structure.

When the rollers 9 reach the bottom of track 8, the direction of fluid flow is reversed in the cylinders 16 so as to increase the volume of chambers 16a and decrease the volume of chambers 16b. In this way the shafts 12, the guide means interconnecting the latter with platforms 5, and these platforms 5 will all be raised with respect to the structure 1 which rests on the ground at this time. The weight of the platforms 5 exerts a downward force on the rollers 9 which is converted by each track 8 into a forward component acting in the same direction as that in which the structure 1 was transported, so that these platforms 5 now move forwardly with respect to the structure 1 until the top end of each track 8 reaches rollers 9, and at the top of the stroke of piston 13 and shaft 12 therewith, the side plates 10 engage the superstructure 1 so as to hold the platforms 5 in a horizontal position slightly raised from the ground so that these platforms 5 do not interfere with the turning of the structure 1 with respect to bottom portion 3 through operation of the device 4. In this way it is possible to control the direction in which the structure 1 is transported.

It is evident that the above-described cycle of operations may be repeated so as to alternately move the structure 1 and platforms 5 forwardly with respect to each other. With the above-described apparatus the structure 1 is not tilted during transportation thereof and may be very easily stopped at any desired position of the rollers 9 along the tracks 8 so that the location of the structure 1 may be very accurately determined. During movement of platforms 5 with respect to structure 1, the perforated pistons 21 move to the left in cylinders 20, as viewed in Fig. 2, so as to provide a smooth movement of these platforms 5.

According to the embodiment of the invention which is shown in Figs. 3 and 4, the track 8a of frame 6a, which corresponds to the track 8, extends in a horizontal direction parallel to the platform 5, this frame 6a being fixed to the platform 5 and corresponding to the frame 6 of Fig. 2. The track 8a cooperates with guide rollers 9a to form with the latter a guide means interconnecting the platform 5 and the shaft 50 for movement with respect to each other in a horizontal direction. The shaft 50 is fixed to or integral with the piston 13' which cooperates with a cylinder 16 fixed to the structure 1 in the same way as cylinder 16 of Figs. 1 and 2, this cylinder 16 enclosing and being fixed to the guide means 14a for the shaft 50 which forms with the underside of piston 13' a chamber 16a, the top side of piston 13' forming with the top end of cylinder 16 a chamber 16b, in the same way as was described above in connection with Fig. 2.

As is shown in Fig. 3, a duct 13a passes through the shaft 50 and communicates with chamber 16a, this duct 13a also communicating with the right side 24a of a double acting cylinder 24 in which the piston 25 is located. A duct 13b passes through the shaft 50 and piston 13' to communicate with the chamber 16b, this duct 13b communicating with the opposite side 24b of the cylinder 24. This cylinder 24 turnably carries the rollers 9a, and the piston 25 is connected to a piston rod which is fixed to the frame 6a. The cylinder 24 is pivotally connected to the bottom end of shaft 50 through the medium of a pair of pins 11a passing through the bottom end of shaft 50 and being fixed to the cylinder 24, as shown in Fig. 3. Fluid guide means 18a and 19a respectively communicate with the chambers 16a and 16b for conveying to and from the latter a fluid under pressure, such as oil, for example.

The structure of Fig. 3 operates as follows:

Upon admission of fluid under pressure into the chambers 16b of the cylinders 16, these cylinders together with the heavy structure and the guide means 14a are raised with respect to the shafts 50 and platforms 5. The fluid under pressure in the chambers 16b flows along the ducts 13b to the chambers 24b of the cylinders 24 to urge these cylinders to the left, as viewed in Fig. 3, so that the rollers 9a also move to the left along the tracks 8a so as to urge the structure 1 in the desired direction. With this embodiment of the invention also, the structure 1 is raised only through the slight distance required to overcome the frictional force between the bottom surface of bottom portion 3 of the structure 1 and the ground, the excess fluid beyond that required to raise the structure 1 flowing to the chamber 24b for moving the cylinder 24 and the shaft 50 therewith to the left with respect to the piston 25. When the rollers 9a have reached the left end of the track 8a, as viewed in Fig. 3, the direction of fluid flow is reversed so as to raise the shafts 50 and platforms 5 therewith with respect to the heavy structure 1, and the fluid under pressure simultaneously flows along the duct 13a to the chamber 24a of cylinder 24 to move the piston 25 to the left, as viewed in Fig. 3, so as to cause each platform 5 and the frame 6a and track 8a therewith to move to the left along the rollers 9a since the piston 25 is fixed to the frame 6a, as described above.

Thus, with the embodiment of the invention illustrated in Fig. 3 the structure 1 and the platforms 5 also are alternately raised and moved forwardly in the desired direction.

According to the embodiment of the invention illustrated in Figs. 5, 6 and 7, a transporting arrangement is provided which is capable of reversing the direction of transportation. As is shown in Fig. 5, the frame 6b is provided with a track 8b along which a pair of rollers 9b are adapted to move, these rollers 9b being turnably connected to opposite side plates 20 which are traversed by a pin 11b turnably mounted on the plates 25' which are located on opposite sides of the frame 6b and which are fixed to each platform 5, as shown in Figs. 5 and 6. A pair of shafts 40 and 40' are pivotally connected to the frame 6b on opposite sides of the pin 11b, and these shafts 40 and 40' are fixed at their top ends to the pistons 41 and 41' which are in slidable engagement with the inner surface of cylinders 42 and 42' which are fixed to the heavy structure 1. Adjacent to the bottom ends of these cylinders are located a pair of guide bearings 14b which slidably engage the shafts 40 and 40', respectively, in the same way that the above-described guide means 14 and 14a engage the above-mentioned shafts, and these guide bearings form with the pistons 41 and 41' chambers 42a located in the cylinders 42 and 42', while the top ends of the cylinders 42 and 42' form with the pistons 41 and 41' the chambers 42b. In order to permit the pistons 41 and 41' to move in opposite directions in the cylinders 42 and 42', the cylinders 42 and 42' are pivotally connected to the excavating machine 1 or the like by a pair of horizontally extending pivot pins 16c as best shown in Fig. 6.

Fig. 7 schematically illustrates the manner in which fluid under pressure is conveyed to the cylinders 42 and 42'. The fluid under pressure flows along a duct 26 to the distributor 27 which sends equal amounts of fluid to the chambers 42b through connections 18b, on the one hand, and to the chambers 42a through connections 19b, on the other hand, when the cylinders 42 and 42' are respectively raised and lowered with respect to the pistons 41 and 41'. With such an operation, the structure of Fig. 5 operates in the same way as the structure of Fig. 2 except that during forward movement of heavy structure 1 the frame 6b moves downwardly along the rollers 9b, while during forward movement of platforms 5, the rollers 9b move downwardly along the track 8b.

When it is desired to reverse the direction of transportation of the structure 1, then the pump 29, which is mounted in a bypass line communicating with the chambers 42b, is operated to shift the fluid from one of these chambers to the other of these chambers so that the pistons 41 and 41' move in opposite directions to turn the frame 6b about the axis of pivot pin 11b. For example, with the parts shown in Fig. 5, the direction of transportation will be to the left. By shifting fluid from the left chamber 42b to the right chamber 42b by operating the pump 29, the frame 6b will be turned in a clockwise direction about pivot pin 11b so that the frame 6b will then be inclined in the opposite direction to the inclination of frame 6b shown in Fig. 5. Then the operation of the fluid line 26 and distributor 27 will cause the structure 1 to be transported to the right, as viewed in Fig. 5.

It is possible to provide an apparatus operating on the same principle as the above-described apparatus and at the same time permitting the structure 1, which may be a crane, excavating machine, or the like, to operate, as by turning during transportation of the entire apparatus. Such an arrangement is shown in Fig. 8 according to which three pairs of platforms 5 and 5' are distributed about the apparatus and symmetrically located on opposite sides of a substantially central plane passing through the apparatus. As is diagrammatically shown in Fig. 8, the bottom plate 3, with respect to which the structure 1 must turn, is now carried by and fixed to a framework which is fixed to one of each of the pairs of platforms 5 and 5', for example the platforms 5' which in this case would have a larger surface area than the platforms 5, if desired. The other platforms 5 are connected to cylinders which are fixed to this framework, in the same way that the above-mentioned cylinders are fixed to the superstructure 1, through any of the above-described arrangements shown in Figs. 2–6. Thus, while the platforms 5' and the entire apparatus carried thereby engage the ground, the remaining platforms 5 are raised and moved forwardly in the desired direction. Then these platforms 5 are pressed against the ground and the rest of the entire apparatus is raised with respect to the platforms 5 so as to move along in the desired direction in any of the ways described above. The difference between this embodiment of the invention and those described above is that the entire transporting apparatus is connected to the bottom plate 3 so that this bottom plate is at all times non-rotatable either with respect to the platforms 5 or with respect to the platforms 5', and one of these sets of platforms is always pressed against the ground so that it is possible at all times, even during transportation, to turn the apparatus 1 with respect to the bottom plate 3.

Figs. 9 and 10 diagrammatically illustrate structures for changing the direction in which the platforms 5 extend and so that it is possible to transport the heavy structure 1 in different directions without turning this structure 1. With both of these embodiments of the invention the keys 17 (Fig. 2) which prevent rotation of the shafts are omitted so that the shafts interconnecting the platforms with the structure 1 are now turnable about their axes. These platforms 5 are however non-rotatable about a vertical axis with respect to these shafts, as is the case with all of the above-described embodiments of the invention, so that when the shafts are turned about their axes the platforms 5 will necessarily turn therewith. According to the embodiment shown in Fig. 9, the three shafts 12a, 12b, 12c, corresponding to shaft 12 of Fig. 2, for example, are respectively fixed to links 30a, 30b, 30c, which are respectively turnably connected to rods 31a, 31b, 31c, that are in turn pivotally connected to short arms, that are fixed to a disc 32 located in the same horizontal plane as these linkages, this disc being turnably mounted on the bottom plate 3 of the apparatus for movement about a vertical axis. A pinion 34 is also turnably mounted on the bottom plate 3 and driven by any suitable motor or the like (not shown), and this pinion 34 meshes with a rack 33 fixed to the rod 31a, for example, so that when the pinion 34 is rotated the rod 31a is moved along its length to turn the platform 5a and to simultaneously turn the disc 32' for turning the platforms 5b and 5c in the same direction and through the same amounts as the platform 5a. The bottom plate 3 is provided in its side wall with suitable openings through which the linkages and part of the disc 32 extend.

With the embodiment of the above invention shown in Fig. 10, the platforms 5b and 5c are arranged on one side of the apparatus and each has a smaller area than the platform 5a located on the opposite side of the apparatus. Gear sectors 30a, 30b, 30c are respectively fixed to the shafts 12a, 12b, 12c, and mesh with worm drives 31a, 31b, 31c, respectively. The worm drives 31b and 31c have a common drive shaft which is provided with a bevel gear at 35 meshing with another bevel gear at 35 fixed to the drive shaft of worm drive 31a which extends in a direction normal to the common drive shaft of worm drives 31b and 31c. A drive gear 33 is fixed to the shaft of worm drive 31a and is driven by a pinion connected to motor 34 to be driven thereby so that all worm drives are simultaneously operated to turn the three platforms simultaneously through the same angles and in the same directions. The motor 34 and pinion and gear 33 are located on the bottom plate 3 which is provided with suitable openings through which the worm drives extend to the gear sectors.

It is to be understood that the above-described hydraulic apparatus for moving the vertically extending shafts and the heavy structure 1 with respect to each other are not essential to the invention. For example, it is possible to provide threaded shafts extending upwardly from the platforms and threadedly engaged by nuts which are turnably mounted on the structure 1 and which are rotated by any suitable drive apparatus so as to vertically move these threaded shafts and the structure 1 in opposite directions with respect to each other.

It will be understood that each of the elements described above, or two or more together, may also find a useful application in other types of transporting apparatus differing from the types described above.

While the invention has been illustrated and described as embodied in apparatus for transporting heavy structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A transporting arrangement comprising, in combination, a structure to be transported; a plurality of shafts extending in a vertical direction and being located adjacent said structure; a plurality of first guide means connected to said structure and respectively engaging said shafts to guide the latter and said structure for vertical movement with respect to each other; a plurality of first cylinders respectively enclosing said plurality of first guide means and the top end portions of said plurality of shafts; a plurality of platforms respectively located beneath said shafts to support said structure during transportation thereof; a plurality of horizontally extending second guide means respectively connecting said shafts and platforms for movement with respect to each other in a horizontal direction; a plurality of second cylinders extending in a horizontal direction, being respectively carried by said plurality of second guide means and being connected to said shafts, respectively, for horizontal movement therewith; a plurality of first pistons fixed to the top ends of said shafts and being respectively located in said first cylinders; a plurality of second pistons respectively located in said second cylinders; means fixing said second pistons to said platforms to maintain said second pistons stationary with respect to said platforms; and fluid guiding means communicating with the interior of said first and second cylinders on the opposite sides of said first and second pistons for alternately guiding fluid under pressure to and from opposite sides of said first and second pistons for alternately raising and transporting said structure with respect to said platforms and said platforms with respect to said structure.

2. A transporting arrangement, comprising, in combination, a structure to be transported; a plurality of shafts extending in a vertical direction and being located adjacent said structure; a plurality of first guide means connected to said structure and respectively engaging said shafts to guide the latter and said structure for vertical movement with respect to each other; a plurality of first cylinders respectively enclosing said plurality of first guide means and the top end portions of said plurality of shafts; a plurality of platforms respectively located beneath said shafts to support said structure during transportation thereof; a plurality of horizontally extending second guide means respectively connecting said shafts and platforms for movement with respect to each other in a horizontal direction; a plurality of second cylinders extending in a horizontal direction, being respectively carried by said plurality of second guide means and being connected to said shafts, respectively, for horizontal movement therewith; a plurality of first pistons fixed to the top ends of said shafts and being respectively located in said first cylinders; a plurality of second pistons respectively located in said second cylinders; means fixing said second pistons to said platforms to maintain said second pistons stationary with respect to said platforms; and fluid guiding means communicating with the interior of said first and second cylinders on the opposite sides of said first and second pistons for alternately guiding fluid under pressure to and from opposite sides of said first and second pistons for alternately raising and transporting said structure with respect to said platforms and said platforms with respect to said structure, said fluid guiding means comprising a first set of ducts respectively communicating with one side of said first pistons and one side of said second pistons and a second set of ducts respectively communicating with the opposite side of said first pistons and the opposite side of said second pistons.

3. A transporting arrangement comprising, in combination, a first structure to be transported, said first structure resting during normal use thereof on a support surface; a second structure located adjacent said first structure and adjacent and extending along said support surface; first means interconnecting said structures for alternately, on the one hand, pressing said second structure against said support surface and tending to raise said first structure with respect to said second structure and, on the other hand, tending to raise said second structure with respect to said first structure when the latter rests on said support surface; and second means interconnecting said structures for translating said first structure in a given direction along said support surface with respect to said second structure when said first means tends to raise said first structure with respect to said second structure and for translating said second structure in said direction along said support surface with respect to said first structure when said first means tends to raise said second structure with respect to said first structure, said second means being effective to produce actual translation at the instant when the lifting force of said first means reduces the force of friction between the structure and the supporting surface to a value less than the translating force exerted by said second means, whereby said structures are alternately moved in said direction along said support surface while contacting the latter as soon as the force of said second means becomes greater than the force of friction between said surface and structures.

4. A transporting arrangement as defined in claim 3, wherein said second structure is a platform means, wherein said first means interconnecting said structures comprises shaft means extending in a vertical direction and being located adjacent said first structure; first guide means connected to said first structure and engaging said shaft means to guide the latter and said first structure for vertical movement with respect to each other, and raising means operatively connected to said shaft means and first guide means for alternately raising said first guide means and said first structure therewith with respect to the shaft means and said shaft means and said platform means therewith with respect to said first guide means and said first structure, said platform means being located beneath said shaft means to support said first structure during transportation thereof; and wherein said second means interconnecting said structures comprises second guide means interconnecting said shaft means and platform means for movement with respect to each other in a direction which is downwardly inclined with respect to a horizontal plane so that during raising of said first guide means and said first structure therewith with respect to said shaft means the latter moves downwardly along said second guide means to transport said first structure in a predetermined direction and so that during raising of said shaft means with respect to said structure said platform moves downwardly along said shaft means also in said predetermined direction.

5. A transporting arrangement as defined in claim 4 and including damping means connected to said second guide means for retarding the movement of said platform means and said shaft means with respect to each other so that said platform means and said shaft means move smoothly with respect to each other.

6. A transporting arrangement as defined in claim 3 wherein said second structure is a plurality of platforms; wherein said first means interconnecting said structures comprises a plurality of shafts extending in a vertical direction and being located adjacent said first structure, a plurality of first guide means connected to said first structure and respectively engaging said shafts to guide the latter and said first structure for vertical movement with respect to each other, and a plurality of raising means respectively connected to said shafts and said plurality of first guide means for alternately raising said plurality of first guide means and said first structure therewith with respect to said shafts and said shafts and platforms therewith with respect to said plurality of first guide means and said first structure; and wherein said second means interconnecting said structures comprises a plurality of second guide means respectively interconnecting said shafts and platforms for movement with respect to each other in a direction which is downwardly inclined to a horizontal plane, said plurality of platforms being respectively located beneath said shafts to support said first structure during transportation thereof.

7. A transporting arrangement as defined in claim 6 in which said plurality of raising means comprises a plurality of cylinders fixed to said first structure and respectively enclosing said plurality of first guide means and the top end portions of said shafts, a plurality of pistons respectively fixed to the top ends of said shafts and slidably engaging the interior of said cylinders, and fluid guide means operatively connected to said cylinders for guiding fluid under pressure alternately to the top and bottom sides of said pistons.

8. A transporting arrangement as defined in claim 7 and including a plurality of damping means respectively connected to said plurality of second guide means for retarding the movement of said platforms and shafts with respect to each other so that said platforms and shafts move smoothly with respect to each other.

9. A transporting arrangement as defined in claim 6 and including first connecting means respectively interconnecting said platforms and second guide means for movement with respect to each other about horizontal axes extending substantially in the direction in which said first structure is transported, and second connecting means interconnecting said plurality of second guide means and said shafts for movement with respect to each other about axes extending in a direction substantially normal to the direction in which said first structure is transported.

10. A transporting arrangement as defined in claim 3 wherein said second structure is a plurality of platforms located adjacent said first structure to support the same during transportation thereof; wherein said second means interconnecting said structures comprises a plurality of guide means each extending in a downwardly inclined direction and respectively interconnecting said platforms and said first structure for movement with respect to each other in a predetermined direction; and wherein said first means interconnecting said structures comprises raising means operatively connected to said first structure and guide means for alternately raising said first structure with respect to said guide means and platforms and said guide means and platforms with respect to said first structure.

11. A transporting arrangement as defined in claim 10 and including tilting means operatively connected to said plurality of guide means for tilting the same to change the direction of movement of said first structure.

12. A transporting arrangement as defined in claim 10 and wherein said raising means comprises a pair of pistons connected to each of said guide means and a pair of cylinders fixed to said first structure and respectively engaging each pair of pistons so that when fluid pressure is supplied alternately to opposite sides of said pistons said first structure on the one hand and said plurality of guide means and platforms on the other hand will be raised.

13. A transporting arrangement as defined in claim 12 and including tilting means operatively connected to said plurality of guide means for tilting the same to change the direction of movement of said first structure, said tilting means comprising a pivotal connection between each of said platforms and guide means and a fluid conveying means communicating with each pair of cylinders for moving fluid therein in opposite directions so as to move said pair of pistons in opposite directions and thereby tilt each of said guide means.

14. A transporting arrangement as defined in claim 3 wherein said second structure are three platforms; wherein said first means interconnecting said structures comprises three shafts extending in a vertical direction and being located adjacent said first structure, three first guide means connected to said first structure and respectively engaging said shafts to guide the latter and said first structure for vertical movement with respect to each other, and three raising means respectively connected to said shafts and first guide means for alternately raising said three first guide means and said first structure therewith with respect to said shafts and said shafts and platforms therewith with respect to said three first guide means and said first structure; and wherein said second means interconnecting said structures comprises three second guide means respectively interconnecting said shafts and platforms for movement with respect to each other in a direction which is downwardly inclined with respect to a vertical plane, said three platforms being respectively located beneath said shafts to support said first structure during transportation thereof.

15. A transporting arrangement as defined in claim 14 and including turning means operatively connected to said shafts for turning the latter and said platforms therewith respectively about the axes of said shafts so as to change the direction of said platforms with respect to said first structure.

16. A transporting arrangement as defined in claim 15 wherein said turning means being mounted in part on a bottom portion of said first structure.

17. A transporting arrangement as defined in claim 16 wherein said turning means comprises a disc turnably mounted on said bottom portion of said first structure, three linkage means respectively interconnecting said shafts with said disc for simultaneously turning said shafts and platforms therewith in the same direction through the same angle upon turning of said disc, a rack connected to one of said linkage means, and a pinion turnably mounted on said bottom portion of said structure and engaging said rack for moving the latter and said one linkage means therewith to turn said disc and move the other two linkage means to turn said shafts and platforms.

18. A transporting arrangement as defined in claim 16 and wherein said turning means comprises three gear sectors fixed to said shafts, three worm means respectively engaging said gear sectors and being interconnected for simultaneous rotation to simultaneously turn said gear sectors through the same amount and in the same direction so as to turn said shafts and platforms therewith, and a single drive means common to said three worm means and being mounted on said bottom portion of said structure for simultaneously driving said three worm means.

19. A transporting arrangement comprising, in combination, a first structure to be transported, said first structure resting during normal use thereof on a support surface; a second structure located adjacent said first structure and adjacent and extending along said support surface; first means interconnecting said structure for alternately, on the one hand, pressing said second structure against said support surface and tending to raise said first structure with respect to said second structure and, on the other hand, tending to raise said second structure with respect to said first structure when the latter rests on said support surface; and second means operatively connected to said first means and structures for transmitting the force of said first means between said structures for translating said first structure in a given direction along said support surface with respect to said second structure when said first means tends to raise said first structure with respect to said second structure and for translating said second structure in said direction along said support surface with respect to said first structure when said first means tends to raise said second structure with respect to said first structure, said second means being effective to produce actual translation at the instant when the lifting force of said first means reduces the force of friction between the structure and the supporting surface to a value less than the translating force exerted by said second means, whereby said structures are alternately moved in said direction along said support surface while contacting the latter as soon as the force of said second means becomes greater than the force of friction between said surface and structures.

20. A transporting arrangement comprising, in combination, a first structure to be transported, said first structure resting during normal use thereof on a support surface; a second structure located adjacent said first structure and adjacent and extending along said support surface; first hydraulic means interconnecting said first structures for alternately, on the one hand, pressing said second structure against said support surface and tending to raise said first structure with respect to said second structure and, on the other hand, tending to raise said second structure with respect to said first structure when the latter rests on said support surface; and second hydraulic means operatively connected to said first hydraulic means and structures for transmitting the force of said first means between said structures for urging said first structure in a given direction along said support surface with respect to said second structure when said first means tends to raise said first structure with respect to said second structure and for urging said second structure in said direction along said support surface with respect to said first structure when said first means tends to raise said second structure with respect to said first structure, whereby said structures are alternately moved in said direction along said support surface while contacting the latter as soon as the force of said second means becomes greater than the force of friction between said surface and structures so that said structures are not actually raised from said support surface.

21. A transporting arrangement, comprising, in combination, a structure to be transported; a plurality of shafts extending in a vertical direction and being located adjacent said structure; a plurality of first guide means connected to said structure and respectively engaging said shafts to guide the latter and said structure for vertical movement with respect to each other; a plurality of first cylinders respectively enclosing said plurality of first guide means and the top end portions of said plurality of shafts; a plurality of platforms respectively located beneath said shafts to support said structure during transportation thereof; a plurality of horizontally extending second guide means respectively connecting said shafts and platforms for movement with respect to each other in a horizontal direction; a plurality of second cylinders extending in a horizontal direction, being respectively carried by said plurality of second guide means and being connected to said shafts, respectively, for horizontal movement therewith; a plurality of first pistons fixed to the top ends of said shafts and being respectively located in said first cylinders; a plurality of second pistons respectively located in said second cylinders; means fixing said second pistons to said platforms to maintain said second pistons stationary with respect to said platforms; and fluid guiding means communicating with the interior of said first and second cylinders on the opposite sides of said first and second pistons for alternately guiding fluid under pressure to and from opposite sides of said first and second pistons for alternately raising and transporting said structure with respect to said platforms and said platforms with respect to said structure, said fluid guiding means comprising a first set of ducts respectively communicating with one side of said first pistons and one side of said second pistons and a second set of ducts respectively communicating with the opposite side of said first pistons and the opposite side of said second pistons, said ducts being formed in part by bores extending along said shafts.

References Cited in the file of this patent
UNITED STATES PATENTS

| 1,615,055 | Turner | Jan. 18, 1927 |
| 1,627,984 | Martinson | May 10, 1927 |
| 2,132,184 | Poche | Oct. 4, 1938 |
| 2,452,632 | Cameron | Nov. 2, 1948 |
| 2,660,253 | Davidson | Nov. 24, 1953 |